May 17, 1938. G. C. AINSWORTH 2,117,278
FRUIT CORER
Filed Sept. 7, 1937
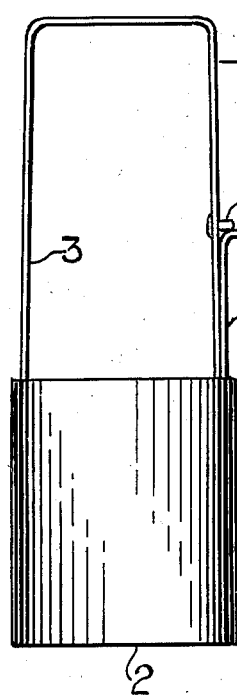
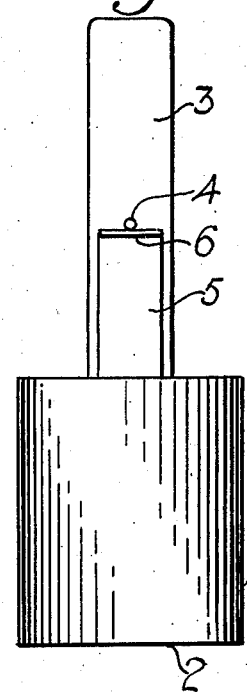
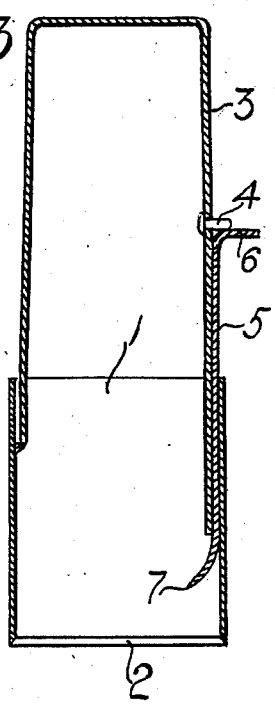
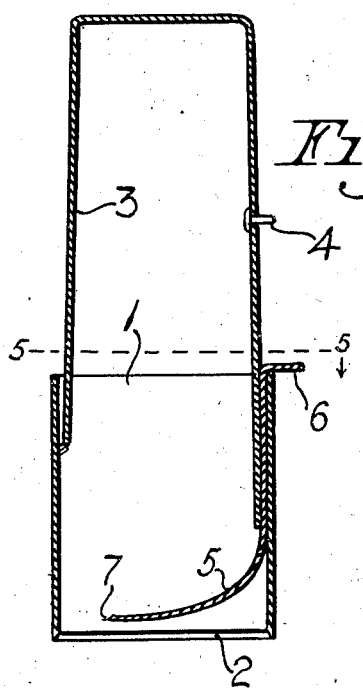
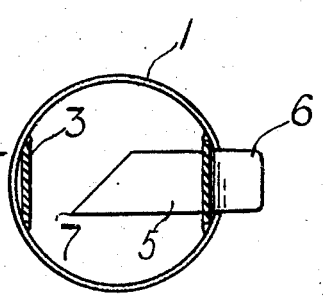
Inventor
George C. Ainsworth,
By Edwin Guthrie,
Attorney Patented May 17, 1938

2,117,278

UNITED STATES PATENT OFFICE 2,117,278

FRUIT CORER

George C. Ainsworth, St. Petersburg, Fla.

Application September 7, 1937, Serial No. 162,788

8 Claims. (Cl. 30—25)

This invention relates to fruit corers, and belongs to that class of implements used to cut out and remove the core and seed from half of a grape fruit or an orange by a pressing and turning operation.

The operation is by hand, and the object of this invention is to provide a corer having special construction, as illustrated substantially in the accompanying drawing of which Fig. 1 represents a side view of all the parts assembled showing the blade in its raised position.

Fig. 2 shows the parts in the same assembled form as in Fig. 1, but turned part way around.

Fig. 3 is a vertical section of the invention showing all parts assembled, with the blade raised.

Fig. 4 is a like vertical section to Fig. 3 showing the blade in lowest position.

Fig. 5 is a transverse sectional view on the broken line 5—5 of Fig. 4.

Throughout the drawing and description, the same number is used to refer to the same part.

Considering the drawing, a cylindrical body or main portion 1 has a bottom cutting edge 2. A handle 3 has its ends inserted into the body and soldered in place to secure the handle and body together. There will be noted a pin 4 projecting from the handle to limit the upward movement of a cutting blade 5 which is arranged and adapted to be moved up and down within the cylindrical hollow body. It is believed to be shown that the upward movement of the blade will be limited by the stop pin 4 projecting from the handle, and that the lower movement of the blade will be arrested by the contact of the lip or finger piece 6 at the top of the blade and the wall of the body cylinder.

This invention is believed to be unlike any other, in that it has a curved, resilient cutting blade, which when withdrawn into a space or sheath provided for it on the perpendicular inside surface of the main cutting cylinder, offers no resistance to the cutting edge of the cylinder being easily forced down into the fruit. Then when the cylinder has reached the proper depth, the cutting blade which has usually a small sharp angle 7, is forced downwardly until stopped resulting in a curving cutting movement and passing under the core and seed. As the cylinder is rotated, clockwise, the blade easily severs all the pulp and attachments, the core coming away as a whole in the corer as it is withdrawn from the fruit. The edges of the cutting blade may be smoothly keen or serrated.

It will be understood that this invention is not limited to any particular material or size, or to the precise form set out in the drawing herewith.

Having now described this invention and the manner of its use, I claim:—

1. A fruit corer, comprising a hollow body provided with a cutting edge, a handle secured to the body whereby the cutting edge of the body may be pressed into the fruit, a cutting blade movable up and down with respect to and carried by the body, the said blade having a lower portion arranged to project transversely of the hollow body when the blade is moved downwardly.

2. A fruit corer, comprising a hollow body provided with a cutting edge, means borne by the body whereby the cutting edge thereof may be pressed by hand into the fruit, a sliding cutting blade movable up and down with respect to the body, means carried by the body for guiding the blade, the said blade having a portion arranged to project across the body when the blade is moved downwardly.

3. A fruit corer, comprising a hollow body provided with a cutting edge, a handle secured to the body and extending above the body whereby the cutting edge thereof may be pressed into the fruit, a sliding cutting blade movable up and down with respect to the body and supported by the body, the said handle having a stop pin projecting into the path of the blade and arranged to limit the upward movement of the blade, the said blade having a projecting lip whereby it may be raised and lowered, and the said blade having a portion constructed and arranged to project transversely with respect to the body when the blade is moved downwardly.

4. A fruit corer, comprising a hollow body provided with a cutting edge, a handle secured to the body and extending above the body whereby the cutting edge thereof may be pressed into the fruit, a sliding cutting blade movable up and down within the body contiguously with respect to the handle, a stop pin projecting from the handle and arranged to limit the upward movement of the blade, the said blade having a portion constructed and arranged to project transversely with respect to the interior of the body when the blade is moved downwardly.

5. A fruit corer, comprising a hollow body provided with a cutting edge, a handle secured to the body and extending above the body whereby the cutting edge thereof may be pressed into the fruit, a sliding cutting blade movable up and down within the body contiguously with respect to the exterior surface of the handle, said handle having a stop pin projecting in the path of the blade to limit the upward movement of the blade, the said blade having a projecting member arranged to make contact with said body and limit the downward movement of the blade, and the said blade having a portion constructed and arranged to project transversely with respect to the interior of the body when the blade is moved downwardly.

6. A fruit corer, comprising a hollow body provided with a cutting edge, a handle secured to the body and extending above the body whereby the cutting edge thereof may be pressed into the fruit, said handle having one end extending into the body and secured thereto whereby a vertical space is formed between the handle and the inner surface of the body, a sliding cutting blade movable up and down in the said space, said handle having a projecting pin located in the path of the blade to limit the upward movement of the blade, the said blade having a projecting member arranged to make contact with the said body and limit the downward movement of the blade, and the said blade having a portion constructed and arranged to project transversely with respect to the interior of the body when the blade is moved downwardly.

7. A fruit corer, comprising a hollow body provided with a cutting edge, a sliding cutting blade adapted to be moved up and down with respect to the body, means carried by the body for guiding the blade, the said blade being a permanently curved resilient piece adapted to assume a straight form in the said guiding means in the upper position of the blade and to curve transversely across the hollow body when the blade is moved downwardly.

8. A fruit corer, comprising a body portion provided with a cutting edge, a sliding cutting blade adapted to be moved up and down with respect to the body, means carried by the body for guiding the blade, the said blade being a permanently curved resilient piece adapted to assume a straight form in the said guiding means in the upper position of the blade and to extend in a curve with respect to the body when the blade is moved downwardly.

GEORGE C. AINSWORTH.